United States Patent
Zhou (10) Patent No.: US 8,694,547 B2
(45) Date of Patent: Apr. 8, 2014

(54) SYSTEM AND METHOD FOR DYNAMIC STATE-SPACE ABSTRACTIONS IN EXTERNAL-MEMORY AND PARALLEL GRAPH SEARCH

(75) Inventor: Rong Zhou, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 548 days.

(21) Appl. No.: 12/498,969

(22) Filed: Jul. 7, 2009

(65) Prior Publication Data

US 2011/0010396 A1    Jan. 13, 2011

(51) Int. Cl.
*G06F 17/30*    (2006.01)
*G06F 15/16*    (2006.01)

(52) U.S. Cl.
USPC ............................. 707/798; 707/797; 707/758

(58) Field of Classification Search
USPC .......................................... 707/798, 797, 758
See application file for complete search history.

(56) References Cited

U.S. PATENT DOCUMENTS 7,584,444 B2    9/2009    Zhou
7,805,454 B2    9/2010    Zhou

OTHER PUBLICATIONS

Zhou et al, Parallel Structured Duplicate detection, Jul. 2007, pp. 1-7.*
Zhou et al., "Edge Partitioning in External-Memory Graph Search", 20th Int'l Joint Conf. on Artificial Intelligence, Hyderabad, India, Jan. 6-12, 2007.

* cited by examiner

*Primary Examiner* — Alex Gofman
(74) *Attorney, Agent, or Firm* — Fay Sharpe LLP (57) ABSTRACT

Provided is a system and method to perform dynamic state-space partitioning in external memory graph searching. The dynamic partitioning of the state-space search graph leading to substantial improvement of search performance.

14 Claims, 11 Drawing Sheets

| VARIABLES | VALUES | NODES |
|---|---|---|
| {X} | {X = 1}, {X = 2}, {X = 3} | {a, b}, {c, d}, {e, f} |
| {Y} | {Y = 4}, {Y = 5} | {a, c, e}, {b, d, f} |
| {Z} | {Z = 6}, {Z = 7} | {a, b, c, d}, {e, f} |

FIG. 5
FIRST ITERATION OF DYNAMIC PARTITIONING

| VARIABLES | VALUES | NODES |
|---|---|---|
| {X, Y} | {X=1, Y=4}, {X=1, Y=5}, {X=2, Y=4}, {X=2, Y=5}, {X=3, Y=4}, {X=3, Y=5} | {a}, {b}, {c}, {d}, {e}, {f} |
| {X, Z} | {X=1, Z=6}, {X=1, Z=7}, {X=2, Z=6}, {X=2, Z=7}, {X=3, Z=6}, {X=3, Z=7} | {a,b}, ∅, {c,d}, ∅, ∅, {e,f} |

FIG. 6
SECOND ITERATION OF DYNAMIC PARTITIONING

| # | LEN | STATIC ABSTRACTION | | | | DYNAMIC ABSTRACTION | | | |
|---|---|---|---|---|---|---|---|---|---|
| | | RAM | DISK | INCREM EXP | SECS | RAM | DISK | INCREM EXP | SECS |
| 17 | 66 | 908,902 | 50,871,643 | 711,180,658 | 589 | 149,054 | 51,443,638 | 718,502,872 | 854 |
| 49 | 59 | 927,906 | 80,987,861 | 812,948,341 | 697 | 105,021 | 81,209,329 | 817,962,744 | 1,021 |
| 53 | 64 | 244,889 | 48,518,100 | 592,797,672 | 511 | 102,365 | 48,650,054 | 593,080,899 | 690 |
| 56 | 55 | 498,854 | 49,436,882 | 477,575,355 | 424 | 95,883 | 49,570,631 | 480,107,665 | 522 |
| 59 | 57 | 957,496 | 52,834,528 | 531,743,811 | 484 | 169,941 | 53,504,361 | 539,097,048 | 543 |
| 60 | 66 | 867,509 | 218,185,611 | 2,582,825,054 | 2,184 | 680,840 | 218,181,871 | 2,566,169,284 | 2,568 |
| 66 | 61 | 309,651 | 81,919,509 | 920,508,447 | 793 | 124,377 | 82,084,656 | 922,526,667 | 1,014 |
| 82 | 62 | 385,486 | 177,927,698 | 1,865,565,899 | 1,582 | 245,695 | 177,963,645 | 1,859,645,376 | 2,115 |
| 88 | 65 | 1,776,317 | 295,406,768 | 3,357,109,415 | 2,923 | 349,901 | 296,507,472 | 3,354,622,475 | 3,234 |
| 92 | 57 | 324,196 | 48,085,400 | 512,701,523 | 450 | 71,998 | 48,130,370 | 511,378,919 | 702 |

| PROBLEM | LEN | STATIC ABSTRACTION | | | | DYNAMIC ABSTRACTION | | |
|---|---|---|---|---|---|---|---|---|
| | | RAM | DISK | INCREM EXP | SECS | RAM | INCREM EXP | SECS |
| BLOCKS-14 | 38 | 381,319 | 37,129 | 10,763,944 | 21 | 8,637 | 13,738,732 | 40 |
| GRIPPER-7 | 47 | 2,792,790 | 13,000 | 177,532,311 | 506 | 14,999 | 169,318,244 | 298 |
| FREECELL-3 | 18 | 4,279,315 | 151,546 | 107,699,115 | 284 | 35,247 | 101,070,199 | 327 |
| DEPOTS-7 | 21 | 12,877,783 | 410,815 | 184,606,201 | 300 | 32,000 | 255,291,983 | 584 |
| DRIVERLOG-11 | 19 | 15,780,803 | 89,999 | 233,976,409 | 305 | 75,000 | 299,947,271 | 414 |
| GRIPPER-8 | 53 | 14,099,800 | 59,999 | 894,274,064 | 1,427 | 50,000 | 857,433,260 | 1,210 |
| DEPOTS-13 | 25 | 1,110,708 | 81,003 | 27,711,837 | 25 | 14,653 | 25,411,325 | 38 |
| DRIVERLOG-14 | 28 | 26,356,967 | 911,288 | 664,087,448 | 775 | 472,011 | 544,381,999 | 810 |
| LOGISTICS-10 | 42 | 81,728,366 | 8,505,120 | 1,434,271,308 | 3,267 | 448,343 | 1,961,380,522 | 3,959 |

SYSTEM AND METHOD FOR DYNAMIC STATE-SPACE ABSTRACTIONS IN EXTERNAL-MEMORY AND PARALLEL GRAPH SEARCH

BACKGROUND

The exemplary embodiment relates to search algorithms, and more particularly to parallel and external-memory graph searches.

Searching a graph of combinatorial possibilities is a central technique in areas such as planning, combinatorial optimization, and model checking. For many problems in these areas, a bottleneck in the graph searching process is availability of internal memory of a computer system, such as random access memory (RAM). There is currently interest in using external memory, such as disk storage, to improve the scalability of graph search algorithms; however, access to external memory is orders of magnitude slower than RAM. To limit the number input/output (I/O) operations to the slower disk storage, two particular state space approaches have been developed that improve efficiency of graph search algorithms: delayed duplicate detection (DDD) and structured duplicate detection (SDD).

State-space search formalizes the states as nodes in a graph, and the actions as edges that connect one state to another. An optimal solution, one with the fewest steps or the lowest cost, to a planning problem corresponds to a path from the start state to a desired state. Because many solutions exist, nodes in a graph can be reached via a number of alternate paths from the start state, therefore it is often critical to detect duplicate states. Generally, duplicate states are stored in a list in RAM and the list is referenced prior to adding a new node. While this method ensures only a single copy of a state is stored, it also creates a memory bottleneck that prevents large problems from being solved. One solution is to use external memory disks to store previously explored nodes. As the cost per unit storage decreases, hard disks including solid state drives become cost-effective solutions to the memory bottleneck in graph search algorithms. However, the random access speed of disk is six orders of magnitude slower than that of RAM, making disk-based approaches to graph searches impractical. Indeed, all successful approaches to external-memory search make good use of the locality of the search graph to reduce the number of time-consuming I/O reads and writes. In parallel graph search algorithms, the same approach to leveraging graph locality is also effective in reducing the parallelization overhead such as communication and synchronization overhead between multiple threads.

There are a number of different types of algorithms used to perform graph searching, including Breadth-first search algorithms, uniform-cost search (e.g., Dijkstra's) algorithms, best-first search (e.g., A*) algorithms, among others. These and other related graph-search algorithms store generated nodes in memory in order to be able to detect duplicates and prevent node regeneration. The scalability of these graph-search algorithms can be dramatically increased by storing nodes in external memory, such as disk storage. However, as previously noted, because random access to a disk is several orders of magnitude slower than random access to an internal memory (e.g., RAM), benefits are obtained when external-memory graph search algorithms use duplicate-detection strategies that serialize disk access in a way that minimizes disk I/O.

The recently developed algorithms for external-memory graph search, e.g. hash-based DDD and SDD, rely on a hash function, or equivalently, a state-space projection function, that partitions the nodes of the state-space search graph into buckets of nodes that are stored as separate files on disk. For both hash-based DDD and SDD, the state-space projection function must satisfy the same criteria to ensure efficiency and scalability of the search algorithm. Firstly, the set of unique nodes in each bucket must fit in RAM. Secondly, there should not be many more buckets than necessary, which means nodes should be relatively evenly distributed among buckets and buckets should be relatively full. Lastly, search efficiency depends on how well the state-space projection function captures local structure in the graph. To accomplish this form any bucket of nodes, their successor nodes are found in only a small number of other buckets. Hash-based delayed duplicate detection leverages this form of local structure in order to interleave expansion and merging of nodes and structured duplicate detection uses it in its concept of duplicate detection scope.

Finding a state-space projection function that satisfies all of these criteria presents a challenge. In the past, handcrafted projection functions (at times called hash functions) were tailored to specific search domains with well-understood structure. More recently, appropriate projection function were automatically generated by heuristic-guided greedy searches of a corresponding space of possibilities. All previous work used static projection functions that did not change during the progress of the search. Static partitioning can capture local graph structure. However, for a static partition that captures local structure, it is difficult to predict in advance the number of nodes that will map to each bucket; in practice, the distribution of nodes to buckets can be very uneven. A randomized hash function creates a static partition that evenly distributes nodes among buckets. But it does not capture any local structure, since it allows nodes in one bucket to have successor nodes in any other random bucket. In short, it is difficult to design a projection function that both captures local structure and evenly distributes nodes among buckets.

The following describes a system and method which addresses the existing shortcomings and is believed to proved improvements to the present state of external memory graph searching.

INCORPORATION BY REFERENCE

The following patent/applications and articles, the disclosure of each being totally incorporated herein by reference are mentioned:

U.S. Patent Application Publication No. US2008/0143723A1, published Jun. 19, 2008, to Rong Zhou, entitled "System and Method for External-Memory Graph Search Utilizing Edge Partitioning"; and U.S. Patent Application Publication No. US2009/0024586A1, published Jan. 22, 2009, to Rong Zhou, entitled "System and Method for Parallel Graph Search Utilizing Parallel Structured Duplicate Detection."

BRIEF DESCRIPTION

Provided is a system and method to perform dynamic state-space partitioning in external memory graph searching. The dynamic partitioning of the state-space search graph leading to substantial improvement of search performance.

DETAILED DESCRIPTION

The following discussion describes a dynamic state-space abstraction system and method for use in external-memory and parallel graph search that exploits problem-decomposition schemes that improves memory and time efficiency.

The disclosed dynamic state-space abstraction allows the state-space projection function to adapt to the problem instance, search strategy, and heuristics in the course of the search. The actual nodes generated during the search are used to compute the best state-space abstraction that minimizes the size of the largest file. This allows the search algorithm to monitor the distribution of nodes in buckets at runtime, and modify the projection function to improve search performance. In case the set of nodes in a bucket does not fit in RAM, for example, the algorithm changes the partition so that the search can continue. To avoid overhead, the dynamic abstraction algorithm is invoked only if there is a significant imbalance in the file sizes, and the largest file consumes a substantial fraction of available RAM. The overhead for dynamically repartitioning the state space is modest, and, in practice is more than compensated for by the improvement in the space and time complexity of the search.

1.0 Motivation

To understand the newly presented concepts, it will be useful to review and compare hash-based delayed duplicate detection and structured duplicate detection, and focus on the role played by the state-space projection function in each approach. A projection function is used to partition the stored nodes of a state-space search graph into buckets, where each bucket of nodes is stored in a separate file. A common way to specify a projection function is by specifying a subset of state variables; states that have the same values for this subset of variables map to the same bucket. A projection function captures local structure in a graph if for any bucket of nodes, successor nodes are found in only a small number of other buckets, called its neighbors. In other words, it captures local structure when the largest number of neighbors of any bucket is small relative to the total number of buckets.

1.1 Hash-Based Delayed Duplicate Detection

Hash-based delayed duplicate detection (DDD) was developed to avoid the overhead of sorting-based DDD, which relies on external sorting of files to detect and remove duplicate nodes.

Hash-based DDD uses two hash functions, where the first corresponds to a state-space projection function. As new states are generated they are placed into separate files based on this first hash function. This guarantees that all duplicate nodes end up in the same file. To remove duplicates from a file, the file is read into a hash table that fits in RAM and is associated with a second hash function. Duplicate nodes that map to the same slot of the hash table are "merged." Finally, the contents of this hash table are written back to disk as a file of unique nodes.

A breadth-first search algorithm that expands one level of the search space at a time, the files at the current level of the search space contain no duplicate nodes, and are called expansion files. As the nodes in each of these files are expanded, their successor nodes are written to files at the next depth of the search space, with the value of the first hash function determining which file they are written to. Since these files contain duplicate nodes that will be removed in the merge phrase of the algorithm, they are called merge files. Because expanding all files at the current level before merging any files at the next level could require a large amount of extra disk space to store all of the duplicate nodes, interleaved expansion and merging had been proposed. This is possible only if the projection function captures local structure in the state-space search graph; that is, it depends on the nodes in each expansion file having successor nodes in only a small number of merge files. As soon as all the expansion files that have successors in a particular merge file have been expanded, duplicates can be removed from the merge file (by copying the file into a hash table in RAM) even if all expansion files in the current level of the search space have not yet been expanded. To save disk space, merging duplicates in a file is given priority over expanding another file.

Figure 1:
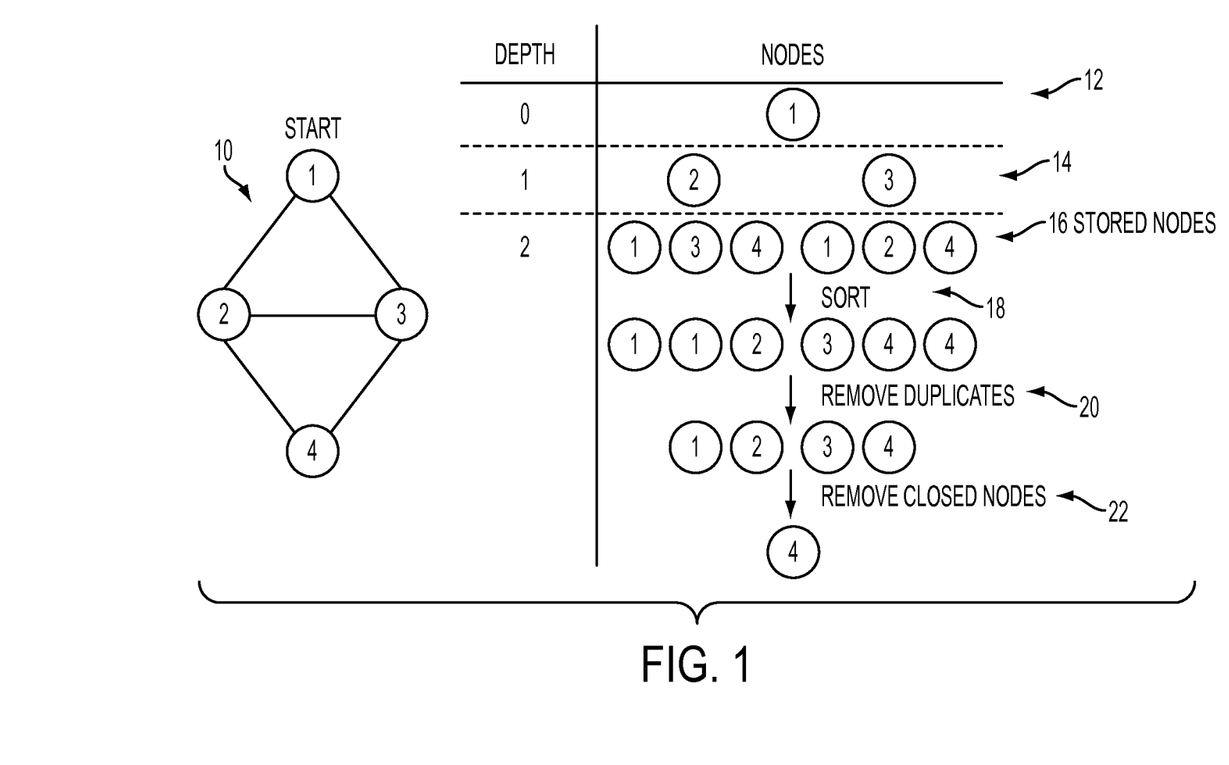
FIG. 1 depicts a graph which is to be searched, and a delayed duplicate detection (DDD) process which may be used.

Turning to FIG. 1, illustrated is a graph 10, to which delayed duplicate detection (DDD) 12 is applied. In its original and simplest form, delayed duplicate detection (DDD) expands a set of nodes (e.g., the nodes on a search frontier) 14 without checking for duplicates, and stores the generated nodes (including duplicates) in a disk file (or files) 16. The file of nodes is then sorted 18 and duplicates are removed 20. Thereafter, closed nodes are removed 22. In this case, the closed nodes (i.e., the Closed list) are nodes 1, 2, and 3. In keeping with its use by theoretical computer scientists in analyzing the complexity of external-memory graph search, DDD makes no assumptions about the structure of the search graph, except that it is undirected and unweighted. Although in certain special cases DDD may be applicable to directed and weighted graphs (such as a lattice graph of multiple sequence alignment), it requires the graph having a particular kind of structure that many graphs don't have.

1.2 Structured Duplicate Detection

The idea of leveraging local graph structure to interleave the expansion and merging steps of hash-based DDD was adapted from an approach to external-memory graph search called structured duplicate detection (SDD). A comparison hash-based DDD to edge partitioning SDD will show why the state-space projection function used by both approaches must satisfy the same criteria.

Like hash-based DDD, SDD uses two hash functions. It partitions the nodes in each level of the search space into separate files based on the first hash function, that is, the projection function. For each file, it expands the nodes contained in the file and writes the successor nodes to files in the next level of the search space. The key difference between SDD and hash-based DDD is that SDD does not delay duplicate detection; all duplicate nodes are detected and eliminated as soon as they are generated, without writing any duplicate node to disk. In its original form, SDD accomplishes this by copying the duplicate-detection scope of the currently-expanding file into a hash table in RAM associated with the second hash function. The duplicate-detection scope consists of all nodes in any of the neighbor files of the expanding file. Since this requires the nodes in multiple files to fit in RAM at once, this form of SDD has a larger internal-memory requirement than hash-based DDD, if they both use the same projection function. (Recall that hash-based DDD never requires more than one file of unique nodes to fit in RAM at once.)

Edge partitioning reduces the internal-memory requirement of SDD in the following way. If the duplicate-detection scope of an expansion file does not fit in RAM, then one or more of its neighbor files are not copied into RAM. Instead, when expanding the nodes in the expansion file, the successor nodes that map to one of these neighbor files are simply not generated. After every node in the expansion file is expanded, the ignored neighbor file(s) are copied into RAM, replacing the neighbor files that were previously in RAM, and the nodes in the same parent file are expanded again. This time, the successor nodes that mapped to one of the neighbor files that is no longer in RAM are not generated, and only the successor nodes that map to the neighbor file(s) in RAM are generated and saved, as long as they are not duplicates. Thus, by incrementally expanding the nodes in a file, the internal memory requirements of SDD can be reduced to the point where no more than one (neighbor) file needs to be stored in RAM at once, the same as for hash-based DDD. The time and space overhead of writing all duplicate nodes to disk and removing them in a later merge step is avoided. But whenever a duplicate-detection scope does not fit in RAM, SDD with edge partitioning incurs the different time overhead of having to read the same expansion file multiple times.

Figure 2:
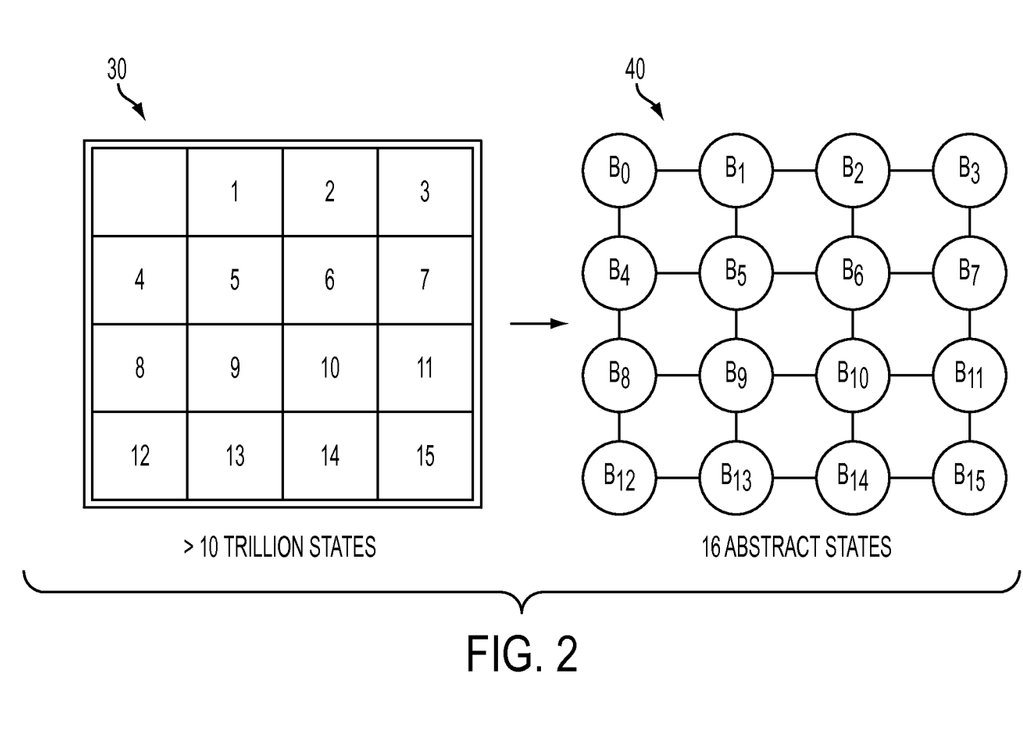
FIG. 2 illustrates an abstract state-space graph created by a state-space projection function from the state-space graph of a problem.

A general procedure for creating a state-space projection function, used to create an abstract state-space graph, is to ignore one or more state variables in the original problem (i.e., graph). Thus, a state-space projection function is a many-to-one mapping (i.e., one abstract node corresponds to a set of states in the original state space). For example, two abstract nodes y and y' are connected by an abstract edge (or abstract operator) if and only if (i) there exist a pair of states x and x' such that y and y' are the images of x and x' under the state-space projection function, respectively, and (ii) x' is a direct successor of x in the original state space. This concept is illustrated in FIG. 2, which shows the "Fifteen Puzzle" 30 (FIG. 2), having over 10 trillion potential states. By application of a state-space projection function, abstract state-space graph 40 (FIG. 2) is created with 16 abstract states ($B_0$-$B_{15}$), when only the position of the blank space is considered.

Figure 3:
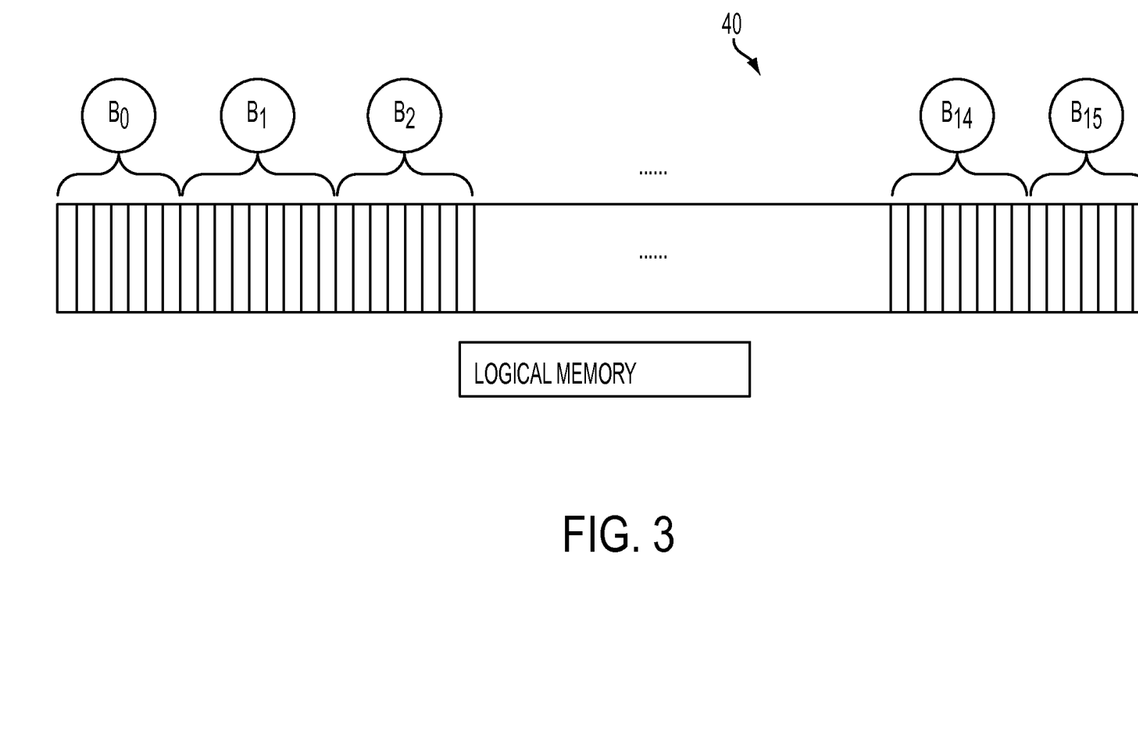
FIG. 3 illustrates Open and Closed lists partitioned into blocks of nodes, with one block for each abstract node in an abstract state-space graph.

An abstract state-space graph reveals local structure in the original problem that can be exploited, even without application of the edge partitioning concepts, by both DDD and SDD to limit disk input/output (I/Os) operations. For example, DDD can use this information to detect duplicates earlier in the process. This can be achieved by grouping nodes into buckets such that nodes in the same bucket map to the same abstract node. For example, Open and Closed lists may be partitioned into blocks (or buckets) of nodes, with one block for each abstract node in the abstract state-space graph, as shown for example in FIG. 3. Then DDD can easily tell if all the nodes that could be predecessors of nodes in a bucket are expanded, and, if so, DDD can remove duplicates in that bucket before all the nodes in a layer of the graph are expanded. This process acts to reduce the amount of external memory needed by DDD during a search, and can result in a faster search.

1.3 Comparison of Approaches

Assuming that hash-based DDD and SDD with edge partitioning use the same projection function, it is clear that they have the same peak RAM requirement: it is the amount of RAM required to store all the unique nodes in the largest file.

As for disk storage, hash-based DDD always needs at least as much disk space as SDD, since both approaches store all unique nodes. In addition, hash-based DDD needs disk space to store duplicate nodes. How much additional disk storage it needs depends on how well the projection function captures local structure in the state-space search graph. If local structure is leveraged to allow interleaving of expansion and merging, it may need very little additional disk space. In the worst case, when merging of files must be postponed until all files in the current layer are expanded, it could require much more disk storage than SDD, by a factor equal to the ratio of duplicate nodes to unique nodes. Note that if the projection function does not capture any local structure, both the internal memory requirement and the disk storage requirement of SDD with edge partitioning remain the same; only its time complexity increases due to incremental node expansions and multiple reads of the same expansion file.

Based on a comparison of the time complexity of hash-based DDD and SDD, both approaches perform extra work that is not performed by the other approach. For hash-based DDD, the extra work is writing all duplicate nodes to disk and eliminating them in a later merge step that copies the nodes in each merge file back to RAM, eliminates duplicates, and writes an expansion file of unique nodes. For SDD with edge partitioning, the extra work consists of incremental node expansions and reading the same file from disk multiple times. The extra work performed by hash-based DDD is proportional to the ratio of duplicate nodes to unique nodes in the search space, which is problem-dependent. The extra work performed by SDD depends on how much local structure is captured by the projection function, since the number of times a file may need to be read from disk is bounded above by the number of its neighbor files.

Hash-based DDD may have an advantage in time complexity when there are few duplicates relative to unique nodes in the search space. SDD may have an advantage when the ratio of duplicates to unique nodes is large, and the projection function captures local structure in the state-space search graph. The best approach is likely to be problem-dependent. Both approaches rely on a state-space projection function that must satisfy the same criteria. It follows that the method for dynamic state-space partitioning can be effective for both approaches.

1.4 Criteria of a Good Projection Function

One criterion the projection function should satisfy is that it should capture local structure in the state-space search graph. For hash-based DDD, this allows interleaving of expansion and merging. For SDD with edge partitioning, it limits the time overhead of incremental expansions.

A more important criterion the projection function should satisfy is that the set of unique nodes in each file must fit in a hash table in RAM. One way to ensure this is to use a high-resolution projection function that partitions the nodes of the state-space search graph into so many files that each is guaranteed to fit in RAM. But partitioning the state space into too many files can degrade search performance. Besides decreasing the average size of a file, the typically uneven distribution of nodes among files means that many files could be empty or nearly empty, making access to disk less sequential. In addition, the search algorithm needs to maintain a table in RAM that keeps track of all files, whether they are open or not, whether they have a write or read buffer, their status as an expansion or merge file (in hash-based DDD), a list of their neighbor files, etc., and the size of this table can grow exponentially with the resolution of the projection function. Refining the partition also tends to increase the number of neighbors of a file. In hash-based DDD, this means that more file buffers must be maintained to allow generated nodes to be written to their corresponding file; since the operating system limits the number of open files, this could be a problem. For SDD, it could lead to more incremental expansions. In general, increasing the resolution of the projection function reduces the peak RAM consumption of the search algorithm in exchange for an increase in its running time, a classic space-time tradeoff.

The results are two competing criteria. The set of unique nodes in each file must fit in RAM but this criterion should be satisfied while also allowing as coarse a partition as possible, in order not to degrade search performance too much. Given an uneven distribution of nodes among files, however, a coarse partition increases the risk that the set of unique nodes in a particular file may not fit in RAM. As will be described in greater detail, dynamic state-space partitioning finds the coarsest partition that still allows the largest file to fit in RAM.

Although this issue arises in general for hash-based DDD, it does not arise for two test domains: sliding-tile puzzles and the four-peg Towers of Hanoi. For these domains, hash functions that are perfect and invertible allow the use of direct-address tables in memory that just need to store a few bits of information for each entry, instead of the entire state description. This allows partitioning the nodes of the state-space search graph into sufficiently many files that the maximum number of unique nodes in each file is guaranteed to fit in the direct-address table in RAM.

In general, perfect and invertible hash functions are not possible; for example, they are not feasible for either domain-independent planning or model checking. Instead, the hash table must store the complete state description with each entry. Since it is usually unrealistic for the projection function to partition the nodes of the search graph into so many files that it is possible to guarantee that the set of all possible nodes that map to a bucket can fit in RAM at once, an open-address hash table is used that allows collisions. The motivation is that the actual nodes in a bucket at any point during the search will fit in RAM. The fact that the number of nodes that will be generated and stored in any file is not known until run time motivates a dynamic approach to state-space partitioning.

1.5 Pathological State-Space Projection Functions

Figure 4:
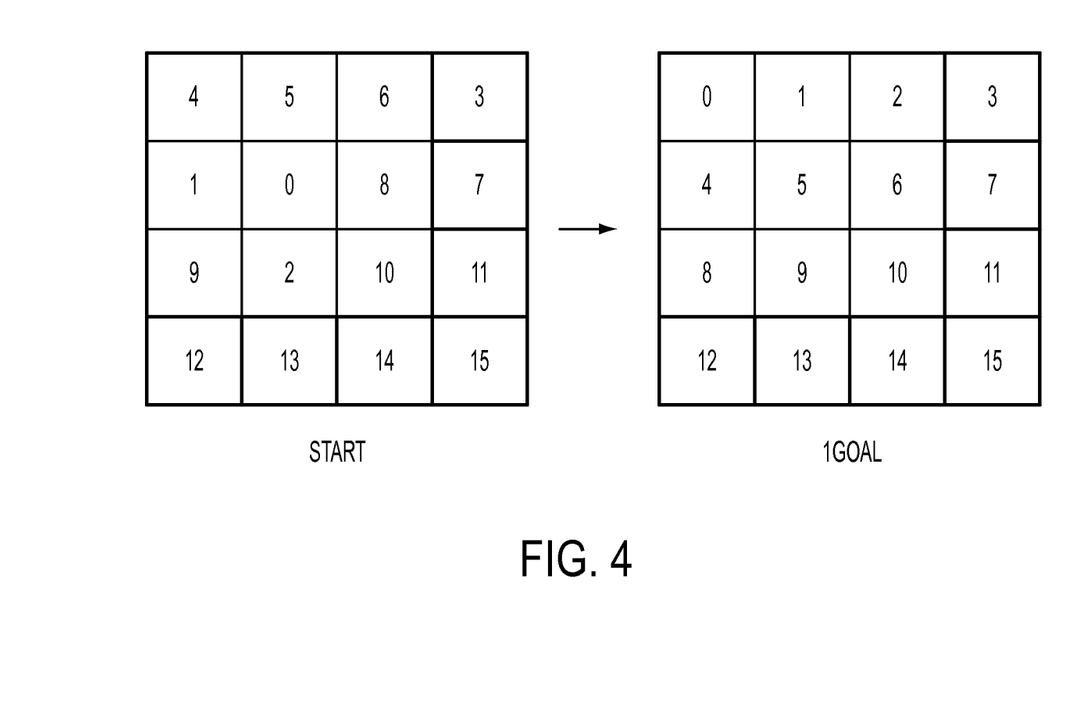
FIG. 4 shows an example of a pathological state-space projection function for an instance of the 15-Puzzle; the gray tiles are the tiles whose positions are considered in the state-space projection function.

With reference to FIG. 4, 15-Puzzle example is used to illustrate the influence of heuristic search on the distribution of nodes among buckets. Suppose the state-space projection function hashes a node to a bucket based on the position of tiles 3, 7, 11, 12, 13, 14, and 15 (shown as gray tiles). Since there are altogether 16!/9!=57,657,600 different combinations for the positions of these 7 gray tiles, each bucket should get a fraction of $57,657,600^{-1}=1.73\times10^{-8}$ of the total number of nodes generated, if the distribution of nodes are perfectly balanced among all buckets. However, for the start state shown in FIG. 4, all the gray tiles are already at their goal positions. Thus an optimal solution does not need to move these gray tiles far away from their current positions. In fact, since the white tiles form a solvable instance of (a variant of) the 8-Puzzle, it can be verified that there is at least one optimal solution that does not require moving a single gray tile.

Since all states that share the same positions of these gray tiles are mapped to the same bucket, the bucket with all the gray tiles located at their goal positions would get the majority of nodes. This is because the heuristic biases the search to move the white but not the gray tiles. Unfortunately, this means that almost every node generated is mapped to the same bucket. Projection functions that create highly imbalanced buckets are referred to as pathological state-space projection functions. In this example, an external-memory search algorithm that uses either hash-based delayed or structured duplicate detection would not save any RAM, and could potentially use more RAM, because the abstract state-space graph could have orders of magnitude more abstract nodes than the number of search nodes expanded in solving the problem. This example also shows that increasing the resolution of the state-space projection function is not guaranteed to work in heuristic search. If the projection function used is pathological, then creating more buckets does not necessarily reduce the size of the largest bucket, which determines the peak RAM requirements in both delayed and structured duplicate detection.

Note that the same state-space projection function would have been perfectly fine if it were used inside a brute-force breadth-first search algorithm, because, in the absence of any search bias, the search is just as likely to move the gray tiles as it is to move the white tiles, resulting in a more balanced distribution of nodes among all the buckets.

2.0 Dynamic State-Space Partitioning

The current embodiment abandons the one-size-fits-all approach to finding state-space projection functions, and rather employs a dynamic strategy that allows the state-space projection function to change from time to time during search, in order to better adapt to the problem instance, the search strategy and the heuristics used. The idea is to use the actual nodes generated during search to compute the best state-space abstraction that minimizes the size of the largest bucket (or nblock).

As an overview, starting with the null abstraction, which maps everything to a single nblock, the dynamic abstraction algorithm iteratively refines the state-space abstraction until either the size of the largest bucket is below some threshold or the maximum size of the abstract search space (e.g., number of buckets) is exceeded. In each iteration, the algorithm tries all possible options of refining the current projection function by adding one more state variable to the existing abstraction (i.e., the complexity of an iteration is linear in the number of state variables). At the end of each iteration, the process picks the state variable the addition of which results in the greatest reduction in the size of the largest bucket, and adds it to the abstraction.

The algorithm (or process) is greedy, since each iteration inherits the state variables added by all its previous iterations (i.e., no backtracking). To reduce the likelihood of committing to a sub-optimal abstraction function prematurely, the dynamic abstraction function (e.g., the dynamic state-space projection function) is called from time to time to check for better abstractions. In one embodiment, the time to check for better abstractions is made when all nodes at a given depth are expanded. To avoid excessive overhead, the dynamic abstraction algorithm is invoked only if there is a significant imbalance in bucket sizes and the largest bucket consumes a substantial fraction of available RAM.

It is noted the projection function that partitions the state space is defined by selecting a subset of state variables. Thus, again beginning with the null set of variables, the algorithm performs greedy search in the space of projection functions by selecting at each step a multi-valued variable (or a related group of Boolean variables) that maximizes the locality of the partition, where locality is defined as the largest number of neighbors of any bucket divided by the total number of buckets. This measure of locality is a good objective function for the greedy search under the assumption that the projection function evenly partitions the stored nodes of the graph, but this assumption is an over-idealization; in practice, the distribution of nodes among buckets can be very uneven.

The dynamic partitioning algorithm monitors the distribution of nodes among buckets in the course of the search and modifies the projection function to adapt to the distribution. The dynamic partitioning algorithm (or process) searches for a projection function that both captures local structure and keeps the size of the largest bucket of nodes as small as possible—in particular, small enough to fit in RAM.

In the initial iteration, again, no state variables have been selected and therefore the partition consists of a single bucket for all nodes. For each bucket in the partition, a vector of counters is kept, one for each state variable that has not yet been selected. All nodes on the disk are scanned and values for the counters are computed, as follows. As each node is read, the algorithm maps the node to one of the buckets of the partition created in the previous iteration. Then, for each state variable that has not yet been selected and the corresponding bucket in a refined partition, whether the node maps to a potential bucket is determined. If the node does map to a potential bucket, the corresponding counter is incremented. At the end of each iteration, the algorithm refines the partition by selecting the state variable which results in the greatest reduction in the size of the largest bucket (and also captures locality in the state-space graph) and adds it to the projection function. Then the process repeats, with new counters. As the abstract search space is being refined, a vector of counters is stored at every abstract state such that the size of the largest bucket can be accurately computed without actually moving the nodes to their new buckets. The algorithm terminates when either the size of the largest bucket is below some threshold or the maximum number of buckets has been reached. It checks whether the partition found by the dynamic algorithm is significantly better than the partition used to organize the current set of buckets. If so, it creates a new set of buckets based on the new partition and copies the nodes on disk to the new buckets. To save disk space, a file that corresponds to an old bucket is deleted immediately after all of its nodes are moved to their new buckets. Thus, dynamically changing the partition does not change the peak disk space requirements of the search algorithm; its only effect is to reduce the peak RAM requirements (see FIG. 7).

It is to be understood, naïve implementation of the above dynamic abstraction algorithm may re-organize the nodes stored both in RAM and on disk in each and every iteration, as the state-space projection function is being refined. However, this can add significant overhead to the overall search, especially since moving disk-bound nodes around can be quite time-consuming. A solution is provided. In each iteration, the algorithm sequentially scans the bucket or nblocks (for good I/O performance) and uses a set of counters to keep track of the number of stored nodes whose state variable being considered (for inclusion in the abstraction) has a particular value. In progression (i.e., forward state-space search) planning, the number of counters should equal the number of possible legal values for the state variable being considered; whereas in regression (i.e., backward state-space search) planning there is a need for one more counter, since the value of a state variable may not be defined in regression search (e.g., a "value undefined" counter). Equivalently, the value of this additional counter can be computed by subtracting the sum of all "legal-value" counters from the total number of nodes stored, which is easy to obtain in the present system.

It is to be understood that all nodes do not need to be stored on disk when the dynamic partitioning algorithm is invoked. Some could be stored only in RAM. The present concepts handle these situations where changing the partition requires moving nodes from RAM to disk, or vice versa. Particularly, the following four cases are handled: (1) moving a RAM node to a RAM bucket, (2) moving a disk node to a disk bucket, (3) moving a RAM node to a disk bucket, and (4) moving a disk node to a RAM bucket. Furthermore, one or more RAM buckets may need to be flushed to disk, if internal memory is exhausted in the middle of moving nodes to their new buckets. Thus, in the fourth case above, the process makes sure there is space in RAM to hold a node read from disk; if not, all the nodes in the new bucket are written to disk. The procedure for handling the second case is then invoked, because the new bucket is no longer in RAM. To save RAM, once a bucket is flushed to disk, it is never read back into RAM until the search resumes.

Another aspect of the process is to avoid excessive overhead for dynamic partitioning. First, since repartitioning the state space involves the time-consuming process of moving nodes on disk and creating new files, it is done only when the dynamic partitioning algorithm finds a significantly better partition, e.g. the reduction in the largest bucket size must be greater than 10%. Second, dynamic partitioning is invoked only if there is a significant imbalance in bucket sizes and the largest bucket consumes a substantial fraction of available RAM, e.g. the ratio of largest bucket size to average bucket size must be greater than three and the largest bucket size must be greater than half of available RAM. How often dynamic partitioning is invoked is problem-dependent. If a good partition is found early in the search, it may not need to be changed. This can be viewed as choosing a partition based on a sampling of the search space.

2.1 Example

Figure 5:
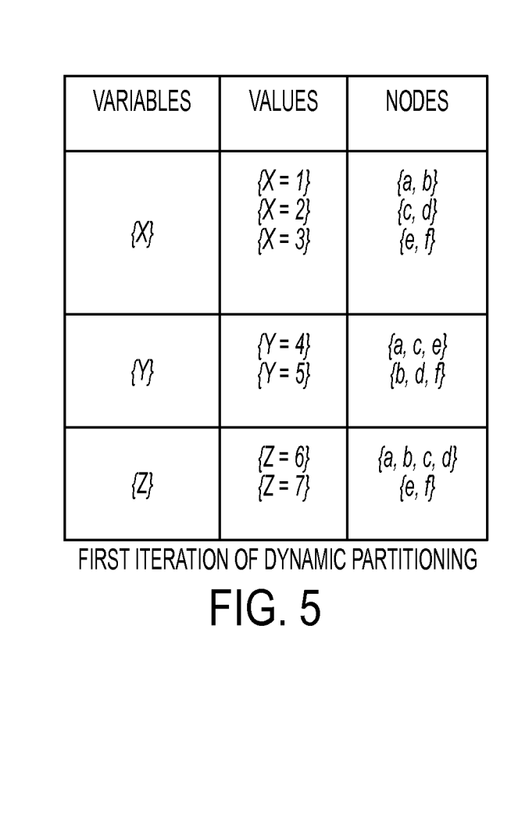
FIG. 5 illustrates a table of a first iteration of dynamic partitioning.
Figure 6:
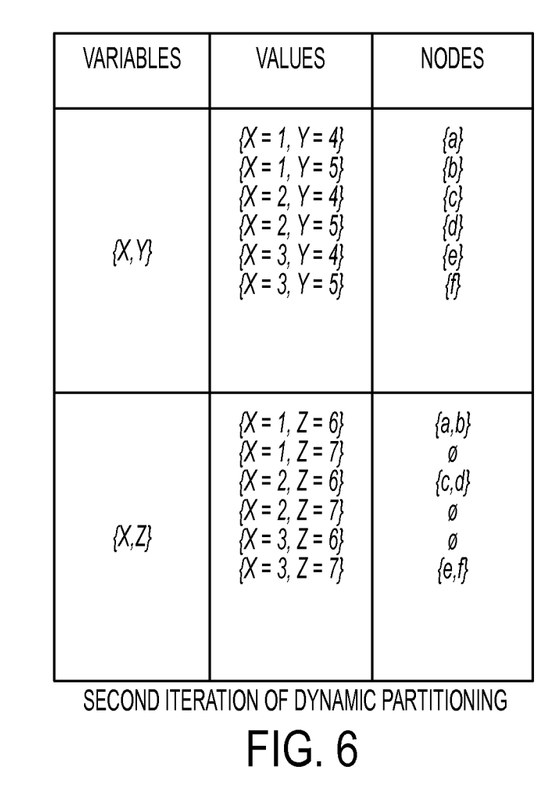
FIG. 6 is a table showing a second iteration of dynamic partitioning.

With reference to FIGS. 5 and 6, an example illustrates how the greedy dynamic partitioning algorithm works. Suppose a search problem has three state variables: $X \in \{1,2,3\}, Y \in \{4,5\}$, and $Z \in \{6,7\}$. The algorithm has generated and stored 6 states (encoded in $\langle X, Y, Z \rangle$ format): a=$\langle 1,4,6 \rangle$, b=$\langle 1,5,6 \rangle$, c=$\langle 2,4,6 \rangle$, d=$\langle 2,5,6 \rangle$, e=$\langle 3,4,7 \rangle$, and f=$\langle 3,5,7 \rangle$. FIGS. 5 and 6 show the first two iterations of the algorithm. In both tables, the "VARIABLES" column shows the set of state variables being considered for the projection function, the "VALUES" column shows the assignment of values to the state variables, and the "NODES" column shows the set of stored nodes whose state encoding matches the corresponding "Values" column. In the first iteration, only three singleton state-variable sets, $\{X\}, \{Y\}$, and $\{Z\}$ are considered. The largest bucket size, as a result of using a single state variable, is 2 for X, 3 for Y, and 4 for Z. Thus, at the end of the first iteration, the state variable X is chosen for the projection function. Since there are only two variables Y and Z left, the second iteration only has two candidates—the variable sets $\{X,Y\}$ and $\{X,Z\}$—for the refined projection function. Clearly, the variable set $\{X,Y\}$ should be chosen, because it reduces the largest bucket size to one, achieving a perfect balance across all buckets.

3.0 Experimental Results

The dynamic state-space partitioning algorithm was implemented inside an external-memory domain-independent STRIPS planner that utilizes a breadth-first heuristic search as the graph-search algorithm on a machine with a Intel Xeon 3.0 GHz processors, 8 GB of RAM and 6 MB of L2 cache. No parallel processing was used in the experiments.

Figure 7:
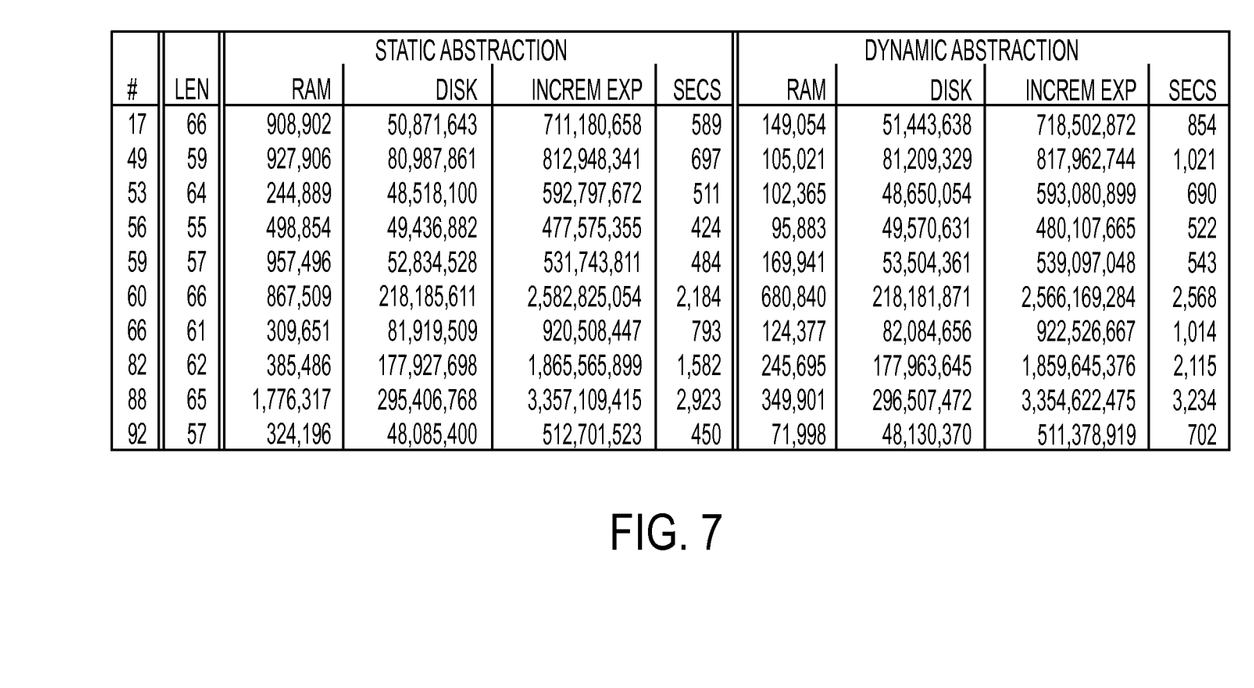
FIG. 7 is a comparison of edge partitioning with and without dynamic state-space partitioning on the 10 hardest of Korf's 100 15-Puzzle instances encoded as STRIPS planning problems.

First, the performance of the external-memory STRIPS planner on the 15-Puzzle was tested with results shown in FIG. 7. Although domain-specific solvers that can find optimal solutions to randomly generated instances of the 24-Puzzle and some easy instances of the 35-Puzzle exist, the 15-Puzzle remains a challenge for domain-independent planners. Previously, the best domain-independent planner could only solve 93 of Korf's 100 15-Puzzle instances by using a very accurate disjoint pattern database heuristic. The dynamic state-space partitioning algorithm with the external-memory domain-independent STRIPS planner is able to solve the entire set using a basic pattern database heuristic equivalent to the Manhattan-Distance heuristic for domain-specific solvers. Currently, there is no record of a domain independent planner able to optimally solve all of the 100 instances of Korf's 15-Puzzle. A performance comparison of ten of the hardest of Korf's 100 random instances of the 15-Puzzle with and without dynamic partitioning is shown in FIG. 7. For example, the most difficult instance #88 can be solved by with dynamic partitioning in less than one hour, storing less than 350 thousand nodes in RAM and less than 300 million nodes on disk. At the size of 36 bytes per RAM node and 14 bytes per disk node, the most difficult instances of the 15-Puzzle can be solved using less than 20 megabytes of RAM. Without external-memory search, a planner would require approximately 10.8 gigabytes of RAM just to store the nodes, even though the underlying breadth-first heuristic search algorithm only stores 30% of the nodes expanded by A*.

For all instances in FIG. 7, the number of buckets, for both static and dynamic partitioning, is 3360. Dynamic partitioning uses a slight amount of extra disk space for moving nodes on disk when the partition is changed dynamically. A portion of the extra time overhead for dynamic partitioning is due to the partitioning algorithm itself, while the remaining time overhead is a result of the extra file I/O as a result of using less RAM.

Figure 8:
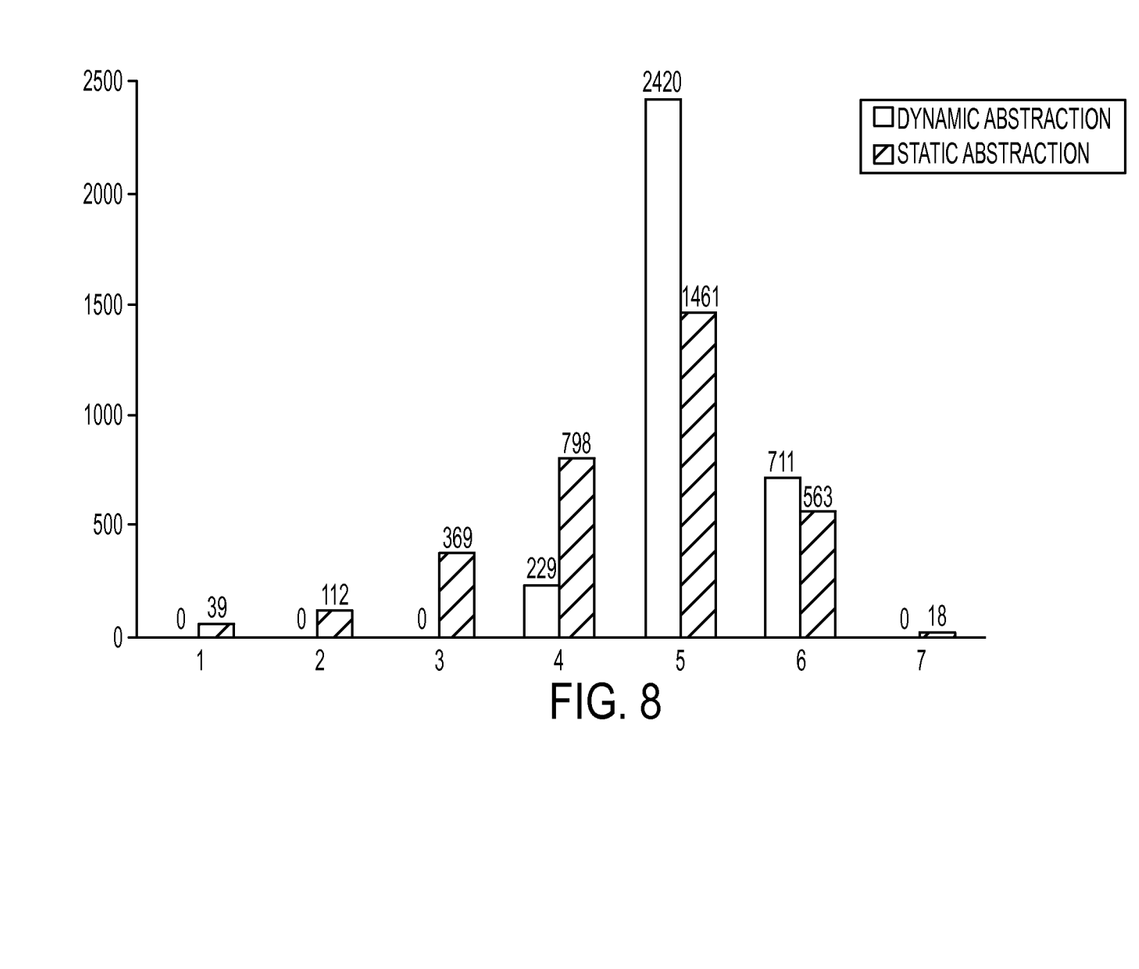
FIG. 8 depicts a graph showing distribution of nodes among buckets using static and dynamic partitioning for Korf's 15-Puzzle problem in stance #88.

Finally, FIG. 8 illustrates the effectiveness of dynamic partitioning. With dynamic partitioning, the distribution of stored nodes among files is more concentrated around an average file size than with static partitioning, which has both larger files and empty files.

Figure 9:
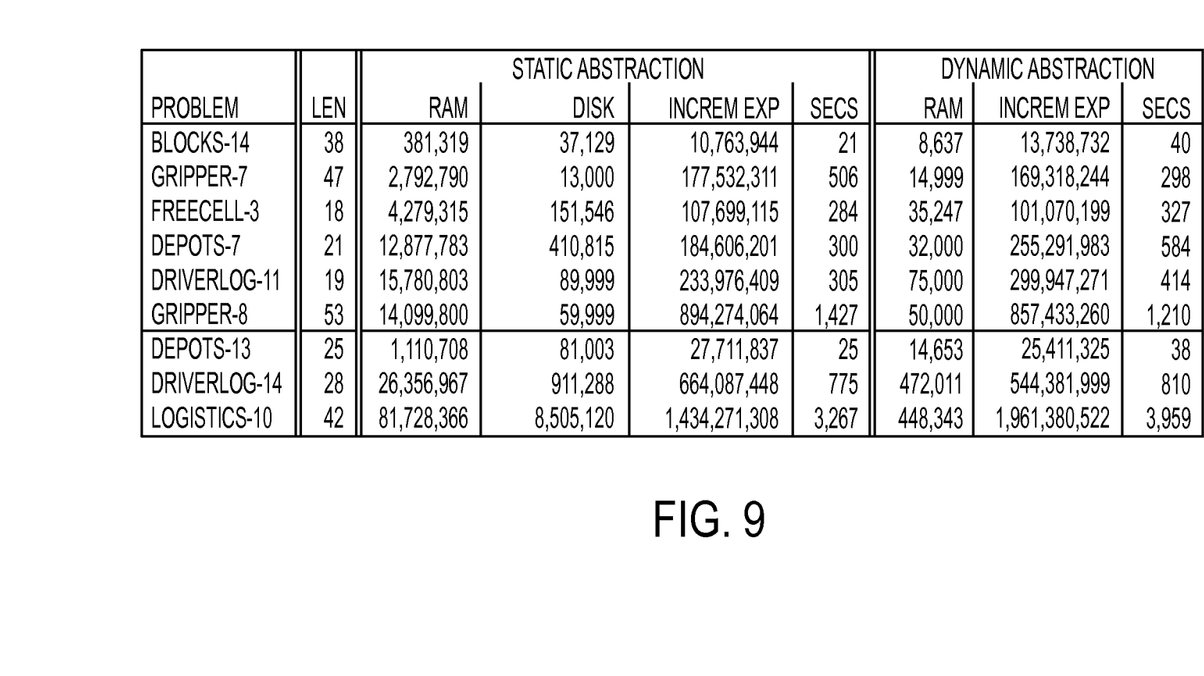
FIG. 9 is a comparison of edge partitioning with and without dynamic state-space partitioning on STRIPS planning domains.

The external-memory planner was also tested on planning problems from a planning competition, with the results shown in FIG. 9. The peak RAM consumption for problems depots-7 and logistics-10 is substantially reduced. Previously, the only way to reduce peak RAM consumption was to use a fine-grained projection function that creates more buckets. But note that in some cases, the reductions in peak RAM consumption were achieved as a result of a coarser partition with fewer buckets, which shows that the resolution of the projection function is not the only factor that determines the amount of RAM saved in external-memory searches. The results show that a large difference exists in peak RAM consumption among projection functions that have the same resolution, a direct benefit of dynamic partitioning based on monitoring the actual distribution of nodes among buckets.

4.0 System

Figure 10:
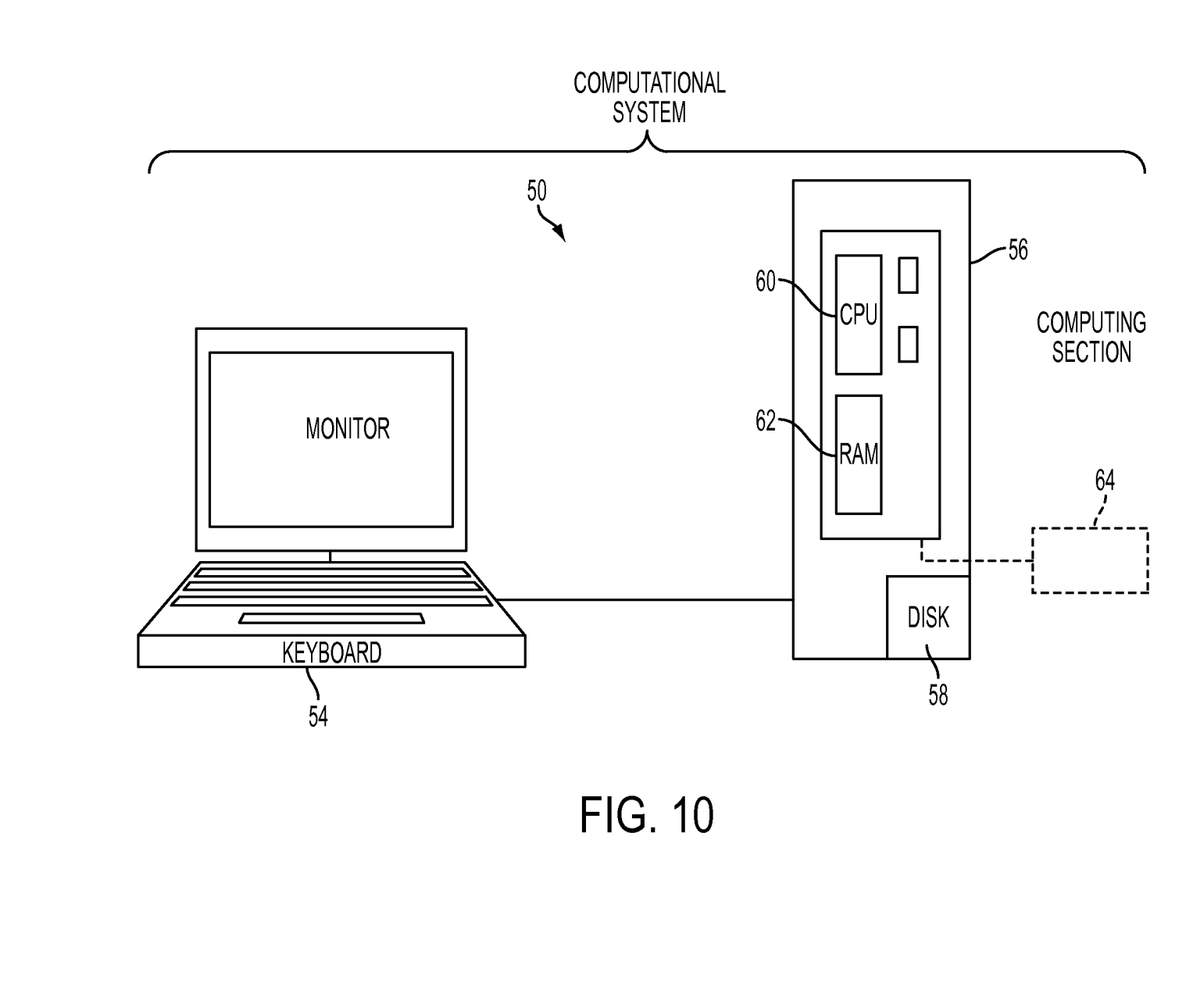
FIG. 10 depicts a system in which the concepts of the present application may be employed.

Concepts described herein may be implemented on a variety of computational systems. An example of one such computational system 50 is shown in FIG. 10, which includes, among other components, a monitor 52, keyboard 54, computing section 56 and external memory such as disk 58. Computing section 56 includes components such as a CPU or other computational component 60, and internal memory 62, such as a RAM. It is of course to be understood computing section 56 may include other components and may be designed in other configurations than shown here. External memory 58 is considered external, as it is external to computing section 56, which results in much slower I/O operations, as compared to internal memory 62. Also, disk 58 may or may not be physically enclosed with computing section 56, as illustrated by optional disk 64. For example, the optional disk 64 might be a network drive.

Figure 11:
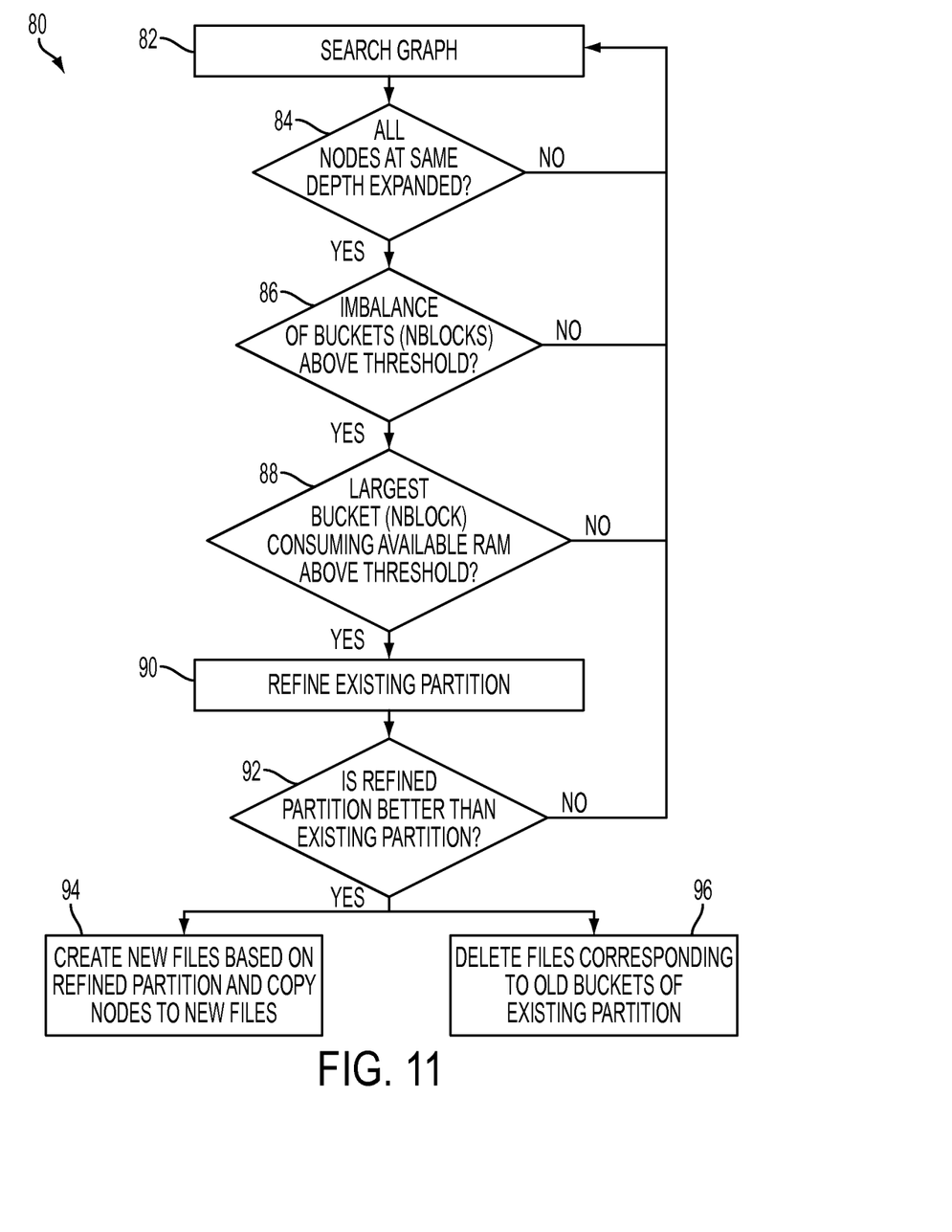
FIG. 11 shows a flow diagram of a process according to the present application.
Figure 12:
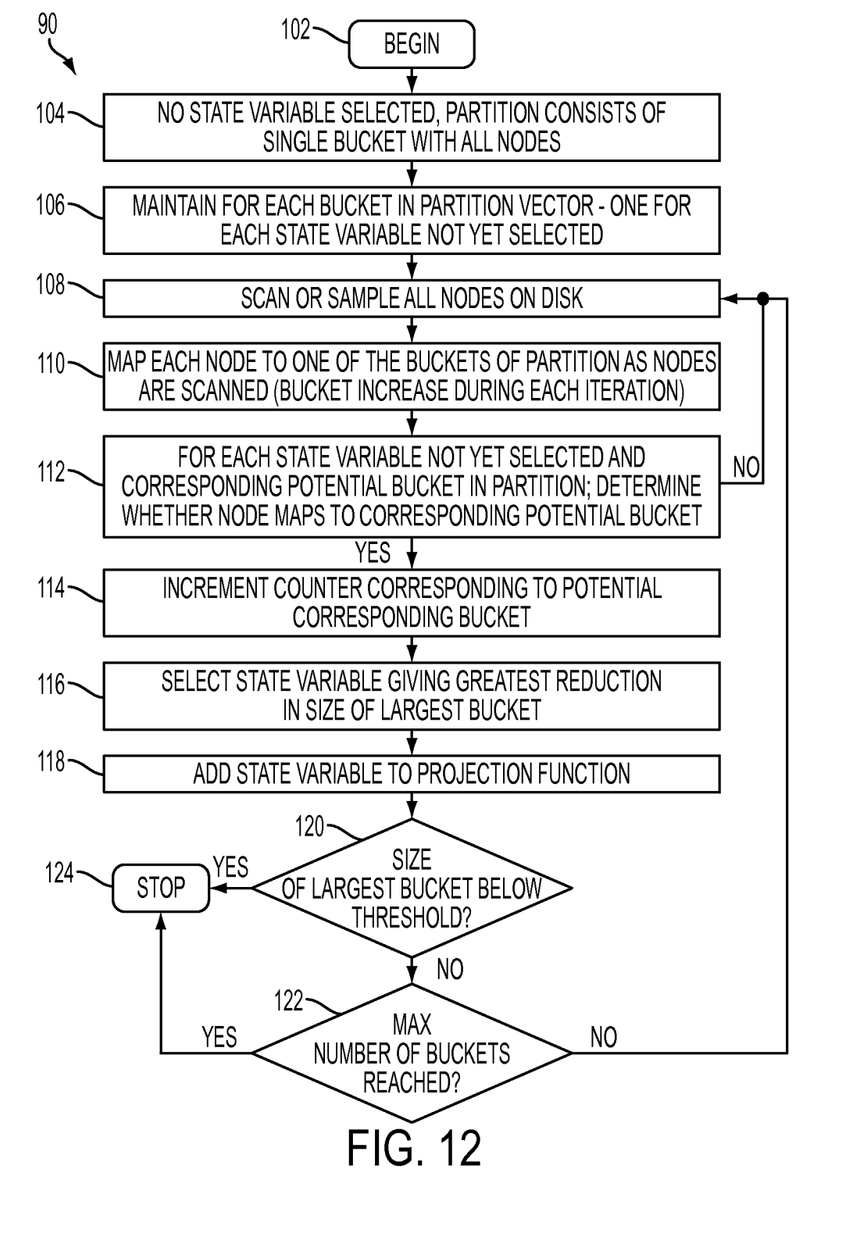
FIG. 12 shows further processing to refine the existing partition.

FIGS. 11 and 12 provide flow charts illustrating external-memory graph search using the dynamic state-space partitioning concepts of the present application.

One particular flow to achieve the above dynamic processing includes an overall process 80 shown in FIG. 11, where a graph is being searched 82. In one optional embodiment, the process monitors if all nodes at a same depth have been expanded 84, if there is an imbalance in the sizes of buckets (nblocks) 86, and if the largest bucket is consuming an amount of available RAM above a predetermined amount 88. If the answer is yes to all three, a dynamic state-space partitioning process is invoked to attempt to refine the existing portion 90. Following the dynamic partitioning process, the refined partition is tested to see whether the refined partition is improved or better than the existing partition 92. If such improvement is not found, the process employs the existing partition and continues to search. However, should the partition generated by the dynamic processing provide a better partition, the process moves to create new buckets based on the refined partition, and to copy nodes to the new buckets 94. To save disk space, a file that corresponds to an old bucket of the existing partition is deleted as soon as all of its nodes are moved to their new buckets 96.

Turning to FIG. 12, the process of generating a refined partition of step 90 (FIG. 11) is shown in more detail by the process flow 90. After beginning 102, no state variables have been selected, and the partition consists of a single bucket with all nodes 104. For each bucket in the partition, vector counters are maintained; in particular, one for each state variable not yet selected 106. At this point the process scans or samples all nodes 108. Scanned nodes will then each be mapped to one of the buckets for each partition 110. It is to be understood that during this process for each iteration of the process, the number of buckets will increase from the single bucket, although nodes are not moved to their new buckets until after the last iteration.

Thereafter, for each state variable that has not yet been selected, and for the corresponding potential bucket in the partition, the process determines whether the nodes map to the corresponding potential bucket 112. If this does not occur, the process moves back to step 108 and repeats. However, if the step 112 is affirmed, a counter corresponding to the potential corresponding bucket is incremented. Then the state variable providing the largest reduction in size of the largest bucket is selected 116, and the state variable is added to the projection function 118. The process then determines if the size of the largest bucket is below the pre-determined threshold 120. When answered in the positive, the process for refining the existing partition (i.e., step 84) ends 124. Then the process moves back to FIG. 11 and proceeds to step 90.

In the alternative, if the largest bucket is not below the threshold, the process moves to step 122, where it is determined whether the maximum number of buckets for the process has been reached. Again, if this is answered in the positive, the process stops and moves back to step 90 of FIG. 11.

However, if the maximum number of buckets has not been reached, the process moves back to step 108.

The above has disclosed an approach to dynamic state-space partitioning in external-memory graph search that substantially reduces peak RAM consumption in exchange for a modest increase in running time and also reduces running time while leaving peak RAM consumption roughly the same. The approach achieves improved performance and a more favorable time-memory tradeoff than static partitioning because the partition is adapted to the actual distribution of stored nodes.

It is also worth noting that the columns labeled "RAM" in FIGS. 7 & 9, which show the peak RAM nodes for structured duplicate detection, also show the peak RAM nodes for hash-based delayed duplicate detection if it uses the same underlying search algorithm (e.g., breadth-first heuristic search) and the same static or dynamic partitioning method. Thus, from the viewpoint of reducing the peak RAM requirements, dynamic partitioning can improve SDD and DDD equally.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for performing an external memory graph search of a search space by a computing system having at least a computing section, an input/output (I/O) and a memory arrangement, the search space including a plurality of nodes, at least some of the nodes stored on an external memory, the method comprising:
   applying a projection function for the graph search;
   applying, during the search, a dynamic partition process that allows the projection function to adapt to at least one of a problem instance, search strategy, and heuristics in a course of the search and monitors a distribution of the nodes among buckets configured to hold the nodes;
   modifying the projection function to adapt to the distribution of the nodes during the search, wherein the method is performed by the computing system;
   calculating the largest bucket in an abstraction of the original search space;
   selecting a state variable from a plurality of state variables which, when added to the projection function, results in a minimum size of the largest bucket;
   performing the dynamic partition process as an iterative approach to refining an initially null abstraction, which maps nodes to a single bucket, until the size of the largest bucket in the partition is below a predefined threshold or the maximum number of the abstract states in the abstract search space have been reached; and
   storing the vector of counters at every abstract state such that a size of a largest bucket can be accurately computed without actually moving the nodes to their new buckets.

2. The method according to claim 1, further comprising:
   using a vector of counters to keep track of nodes with at least one of a particular value or a particular value range of a certain state variable.

3. The method according to claim 1, further comprising comparing a refined partition, obtained by applying the dynamic partition process, with a existing partition based on efficiency;
   if the refined partition is more efficient than the existing partition, generating new buckets based on the refined partition and copying the nodes to the new buckets; and
   if the refined partition is not more efficient than the existing partition, the existing partition remains.

4. The method according to claim 1, further including using a value-undefined counter to monitor a characteristic of a backward state-space search that begins from a pre-defined goal state.

5. The method according to claim 4, further including imposing an upper limit and/or lower limit bound on a size of the abstract search space.

6. The method according to claim 5, further including periodically generating abstractions such that the size of the largest bucket is further reduced.

7. The method according to claim 6, wherein the external memory is used to store explored nodes such that a scalability factor of the graph search is enhanced.

8. The method according to claim 6, wherein parallel computing is used to enhance a speed factor and a scalability factor of the graph search.

9. The method according to claim 1, wherein the projection function partitions the nodes of the graph search into one or more of the buckets.

10. A method for graph searching a search space by a computing system having at least a computing section, an input/output (I/O) and a memory arrangement, the method comprising:
    applying a projection function for the graph search;
    applying a dynamic partition process that monitors a distribution of the nodes among the search space during the search;
    using a vector of counters to monitor a number of nodes of a certain state variable;
    determining a refined partition of the search space based on the monitoring of the nodes, wherein the method is performed by the computing system;
    calculating the largest bucket in an abstraction of the original search space;
    selecting a state variable from a plurality of state variables which, when added to the projection function, results in a minimum size of the largest bucket;
    performing the dynamic partition process as an iterative approach to refining an initially null abstraction, which maps nodes to a single bucket, until the size of the largest bucket in the partition is below a predefined threshold or the maximum number of the abstract states in the abstract search space have been reached; and
    storing the vector of counters at every abstract state such that a size of a largest bucket can be accurately computed without actually moving the nodes to their new buckets.

11. The method according to claim 10, further including a value-undefined counter to monitor a characteristic of a backward state-space search that begins from a pre-defined goal state.

12. The method according to claim 11, further including imposing an upper limit and/or lower limit bound on a size of the abstract search space.

13. The method according to claim 12, further including periodically generating abstractions such that the size of the largest bucket is further reduced.

14. A system for performing a graph search comprising:
    a computing system having at least a computing section, an input/output (I/O) and a memory arrangement, the computing section programmed to:
    use state-space abstraction to form an abstract state-space graph that is used to partition a graph into multiple independent regions that do not interfere with each other for a period of time during the search;
apply a projection function for the graph;
apply a dynamic partition process that allows the projection function to adapt to at least one of a problem instance, search strategy, and heuristics in a course of the search and to monitor a distribution of nodes among buckets configured to hold the nodes; and
modify the projection function to adapt to the distribution of the nodes during the search;
calculate the largest bucket in an abstraction of the original search space;
select a state variable from a plurality of state variables which, when added to the projection function, results in a minimum size of the largest bucket;
perform the dynamic partition process as an iterative approach to refining an initially null abstraction, which maps nodes to a single bucket, until the size of the largest bucket in the partition is below a predefined threshold or the maximum number of the abstract states in the abstract search space have been reached; and store the vector of counters at every abstract state such that a size of a largest bucket can be accurately computed without actually moving the nodes to their new buckets.

* * * * *